(12) United States Patent
Jan et al.

(10) Patent No.: US 6,195,902 B1
(45) Date of Patent: Mar. 6, 2001

(54) LASER EXTENDER

(75) Inventors: Der-Shyang Jan, Taipei; Tony Kuo-Ti Chen, Ping-Chen, both of (TW)

(73) Assignee: Quarton, Inc. (TW)

( * ) Notice: Subject to any disclaimer, the term of this patent is extended or adjusted under 35 U.S.C. 154(b) by 0 days.

(21) Appl. No.: 09/517,376

(22) Filed: Mar. 2, 2000

Related U.S. Application Data

(63) Continuation of application No. 09/129,473, filed on Aug. 4, 1998, now abandoned.

(51) Int. Cl.[7] .............................. B43L 13/00; G01C 15/02
(52) U.S. Cl. ........................ 33/286; 33/451; 33/DIG. 21
(58) Field of Search .................... 33/286, 451, DIG. 21; 362/109, 119, 120, 259, 289

(56) References Cited

U.S. PATENT DOCUMENTS

| | | | |
|---|---|---|---|
| 5,539,990 | * | 7/1996 | Le ................................... 33/DIG. 21 |
| 5,561,911 | * | 10/1996 | Martin ............................ 33/DIG. 21 |
| 5,594,993 | * | 1/1997 | Tager et al. ................... 33/DIG. 21 |
| 5,604,987 | * | 2/1997 | Cupp ............................... 33/DIG. 21 |
| 5,617,641 | * | 4/1997 | Aarhus ................................... 33/374 |
| 5,673,492 | * | 10/1997 | Williams .............................. 33/286 |
| 5,782,003 | * | 7/1998 | Bozzo ................................... 33/286 |
| 5,842,282 | * | 12/1998 | Ting ............................. 33/DIG. 21 |
| 6,012,229 | * | 1/2000 | Shiao ................................... 33/451 |

\* cited by examiner

*Primary Examiner*—Christopher W. Fulton
(74) *Attorney, Agent, or Firm*—Raymond Sun

(57) ABSTRACT

A laser extender is provided for accurately elongating a reference line. The laser extender includes a housing, a battery set, and a laser unit. The housing has an external basic flat plane for resting upon a flat surface and having a straight edge that is adapted to be aligned with a reference line, an internal accommodating space, and a plurality of through holes for accessing the internal accommodating space from the exterior of the housing. The battery set is provided inside the internal accommodating space. The laser unit, utilizing power provided by the battery set, is located inside the internal accommodating space for generating a spanning plane laser beam perpendicular to the basic flat plane of the housing and for extending the reference line defined by the straight edge. In addition, the laser extender can engage a beam leveler for enhancing the leveling ability of the laser extender.

8 Claims, 3 Drawing Sheets

LASER EXTENDER

1. RELATED CASES

This is a continuation of Ser. No. 09/129,473, entitled "Laser Extender", filed Aug. 4, 1998, now abandoned, the entire disclosure of which are incorporated by this reference as though set forth fully herein.

BACKGROUND OF THE INVENTION (1) Field of the Invention

The invention relates to a laser extender, and more particularly to a level extension apparatus which is easy to use and has multipurpose uses.

(2) Description of the Prior Art

In the construction industry, drawing an extension line from a reference line is usually done by applying a ruler or using an ink-string box. The reference line can be corner lines, fence lines, or any horizontal or vertical line defined by a square-beam leveler or other device.

When applying a ruler to draw the extension line, one side of the ruler is used to be aligned with the reference line and the extension line can be formed by using a second ruler as an extension of the aforesaid ruler to elongate the reference line. Though this method can be accurate, this accuracy is only limited to short distances.

The ink-string box in the art comprises a box for carrying a roller at one half and ink at another half. The roller is pivoted on top of the box, and an extension string rolled around the roller. The extension string has a free end that is pulled over the ink and away from the box. While applying the ink-string box to draw an extension line of a reference line, the string is pulled out from the roller and mixed with the ink during the pulling operation, then aligned with the reference line, and then the extension line is formed by flipping the extended inked string to drop the ink lengthwise. Even though the ink-string box is suitable for use in medium or long distance applications, the operation of flipping the inked string is quite human-dependent and may need to be done in segments if a substantial length of string is to be pulled. Thus, a unique straight extension line may sometimes be difficult to achieve by applying the ink-string box and may be subject to human error.

Thus, there remains a need for a line-extension tool that provides accurate alignment and is effective for use in distances of all ranges, yet is easy to use and can be used quickly and efficiently.

SUMMARY OF THE INVENTION

Accordingly, it is an object of the present invention to provide a laser extender, which can be used in accurately elongating a reference line in many applications.

It is yet another object of the present invention to provide a laser extender, which can be provided with a conventional beam leveler for enhancing the measurement capability of the leveler.

It is a further object of the present invention to provide a convenient laser extender, which is convenient to use and which can be used for a wide variety of distances.

A laser extender in accordance with the present invention includes a housing, a battery set, and a laser unit. The housing has an external basic flat plane for resting upon a flat surface, a straight edge, an internal accommodating space, and a plurality of through holes for accessing the internal accommodating space from the exterior of the housing. The battery set is provided inside the internal accommodating space. The laser unit, utilizing power provided by the battery set, is located inside the internal accommodating space, for generating a spanning plane laser beam perpendicular to the basic flat plane of the housing and having an extension line covering the straight edge.

In one embodiment of the laser extender, the housing can include an extension located above the basic flat plane for receiving the laser unit therein, and the extension has a hole through which the spanning plane laser beam can exit.

In one embodiment of the laser extender, the laser unit can be adjustable through a plurality of adjustable screws, with each screw accessible at one end from the exterior of the housing to contact the exterior of the laser unit at another end for adjusting the pressure of the screw onto the laser unit.

In one embodiment of the laser extender, the laser unit can further include a switch for controlling ON/OFF of the power from the battery set. The switch is accessible from the exterior of the housing through one of the through holes, and can further have an additional switch cap placed on top of the switch.

According to one embodiment of the present invention, a beam leveler can engage the laser extender for enhancing the leveling ability of the laser extender. The beam leveler can have an open end for receiving the laser extender, a base plane thereon for resting upon a flat surface, and a leveling unit for inspecting the leveling status of the base plane. The base plane of the beam leveler can further include a main edge. When the beam leveler and the laser extender are combined, the base plane of the beam leveler is coplanar with the basic flat plane of the laser extender, and the main edge of the beam leveler is aligned with the straight edge of the laser extender.

According to one embodiment of the beam leveler, the leveling unit can be a spirit bubble, for determining either the perpendicular status of the spanning plane laser beam or the leveling status of the base plane, or the leveling unit can include separate spirit bubbles for both the perpendicular and the leveling purposes.

BRIEF DESCRIPTION OF THE DRAWINGS

The present invention will now be specified with reference to its preferred embodiments illustrated in the drawings, in which.

DESCRIPTION OF THE PREFERRED EMBODIMENT

The invention disclosed herein is directed to a laser extender. In the following description, numerous details are set forth in order to provide a thorough understanding of the present invention. It will be appreciated by one skilled in the art that variations of these specific details are possible while still achieving the results of the present invention. In other instances, well-known components are not described in detail in order not to unnecessarily obscure the present invention.

Figure 1:
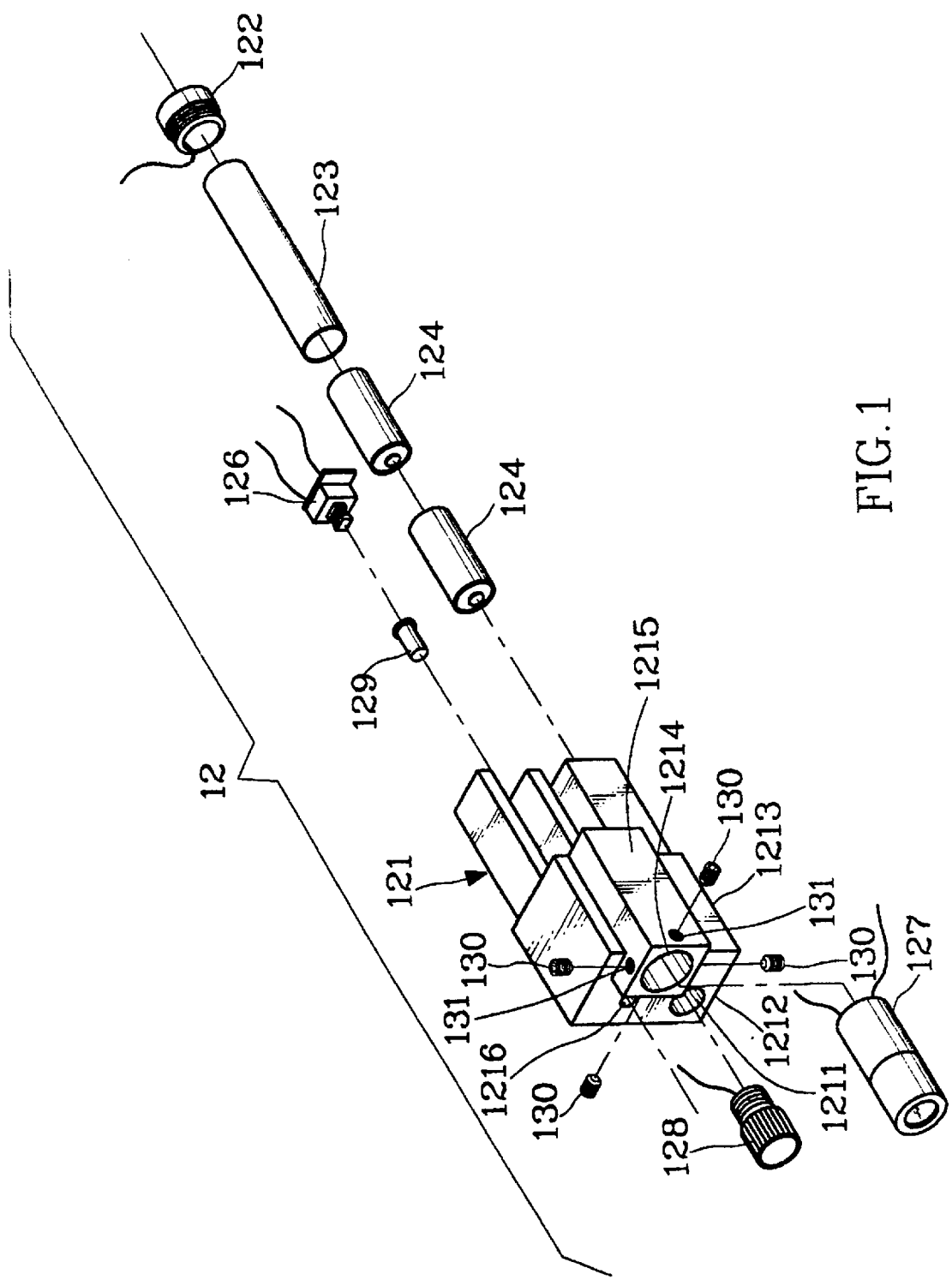
FIG. 1 is a perspective exploded view of a laser extender in accordance with the present invention.

Referring now to FIG. 1, the laser extender 12 in accordance with the present invention has a housing 121, a battery set, and a laser unit 127.

The housing 121 provides an external basic flat plane 1212 for resting upon a flat surface as a reference plane when in use, an internal accommodating space, and a plurality of through holes for accessing the internal accommodating space from the exterior of the housing 121. The basic flat plane 1212 further has a straight edge 1213 acting as a reference edge that can be aligned with a desired line for extension while in operation.

The battery set, which is provided inside the internal accommodating space via a first through hole 1211 of the housing 121, can be embodied by a combination of a plurality of batteries 124 confined between an end cap 122 and a front cap 128. The front cap 128 can be located externally to the housing 121 and have threads for engaging an end of the first through hole 1211 of the housing 121, so that the battery 124 can be replaced by removing the front cap 1211. Furthermore, to provide better insulation for the battery set, the battery set can include a battery sleeve 123 for accommodating the batteries 124 with the end cap 122 threadably connected to one end of the sleeve 123.

The laser unit 127, utilizing power provided by the battery set, is located inside the internal accommodating space via a second through hole 1214, for generating a spanning plane laser beam perpendicular to the basic flat plane 1212 of the housing 121 and having the extension of the spanning plane laser beam extending from and along the straight edge 1213. The spanning plane laser beam can be emitted through the second through hole 1214 on the housing 121. In the embodiment shown in FIG.1, the laser unit 127 is provided inside second through hole 1214 and located at an extension 1215 of the housing 121. Preferably, the extension 1215 is located in a plane above the basic flat plane 1212.

The direction of the laser unit 127 can be adjusted through a plurality of adjustable threaded screws 130 that extend through side holes 131 in the wall of the extension 1215. Each screw 130 has an inner end that extends inside the extension 1215 for contacting the laser unit 127, and an opposing outer end that extends outside the extension 1215 for manipulation by a user. The adjustment can be accomplished by turning the outer ends of the screws 130 to cause the inner ends to apply more or less pressure against the laser unit 127. In addition, the laser unit 127 can be a conventional laser unit that is commercially-available in the industry.

As shown in FIG. 1, the laser unit 127 can further include a switch 126 capable of controlling ON/OFF of the power from the battery set, in such a manner that the switch 126 is electrically connected in series with the battery set as well as the laser unit 127. The serial connection to form a close loop circuit among the laser unit 127, the battery set, and the switch 126 can be formed as follows: a first end of the switch 126 is electrically wired to a second end of the battery set, a first end of the battery set is electrically wired to a second end of the laser unit 127, and a first end of the laser unit 127 is electrically wired to a second end of the switch 126. The switch 126 provided inside the accommodating space is accessible from the exterior of the housing 121 through a third through hole 1216 of the housing 121, and can further have an additional switch cap 129 to be placed right on the left-hand side of the switch 126. Portion of the switch cap 129 protrudes through the third through hole 1216 for providing better human accessibility of the switch 126 from the outside of the housing 121.

When the laser extender 12 is used to extend a reference line on a flat surface, the basic flat plane 1212 of the housing 121 is placed on the flat surface. The straight edge 1213 is then aligned with the reference line. After the alignment is done, the spanning plane laser beam is emitted from the laser unit 127 through the second through hole 1214 and defines an extension line of the reference line in such a manner that the spanning plane laser beam touches the flat surface and forms a cross line as the extension line as explained below in connection with FIG. 3.

Figure 2:
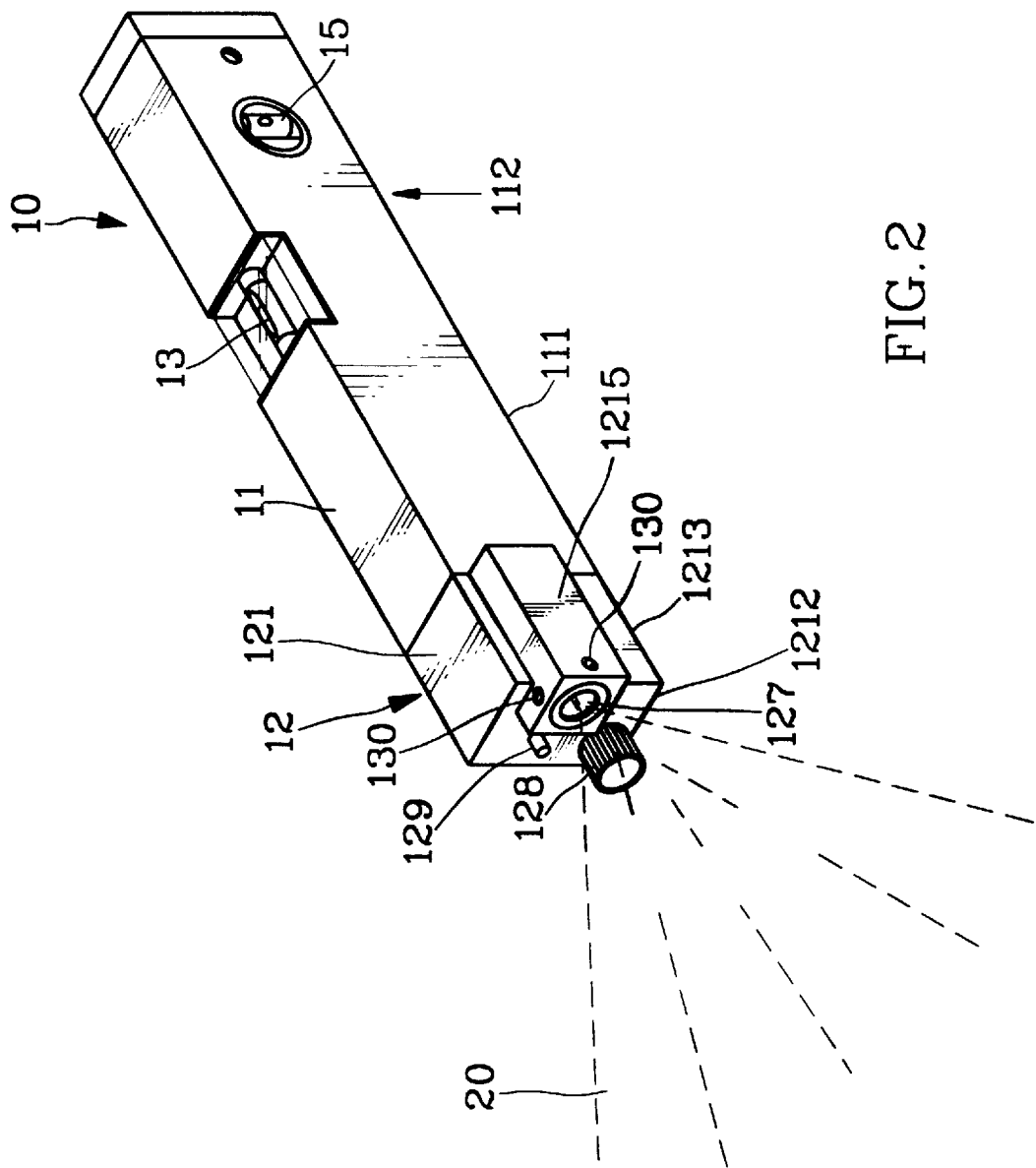
FIG. 2 is a perspective view of a combination of the laser extender of FIG. 1 and a beam leveler.

Referring now to FIG.2, the laser extender 12 can be combined with a conventional beam leveler 10 for enhancing the leveling ability of the laser extender 12. The beam leveler 10 according to the present invention has an open end for receiving the laser extender 12, a base plane 112 for resting upon a flat surface, and a leveling unit for inspecting the leveling status of the base plane 112. Preferably, the base plane 112 of the beam leveler 10 can include a main edge 111.

According to the embodiment of the beam leveler 10 shown in FIG.2, the leveling unit is exposed in the housing 11 of the beam leveler 10 and can include a first spirit bubble 15 for providing the perpendicular status of the spanning plane laser beam 20, and a second spirit bubble 13 for judging the leveling status of the base plane 112. Both spirit bubbles 13 and 15 can be conventional spirit bubbles that are well-known in the art, and are exposed through the relevant portions of the housing 11 to allow the user to conveniently view them.

According to the present invention, the beam leveler 10 and the laser extender 12 are integrated in such a manner that the base plane 112 of the beam leveler 10 is coplanar with the basic flat plane 1212 of the laser extender 12, and the main edge 111 of the beam leveler 10 is aligned with the straight edge 1213 of the laser extender 12, with the spanning plane laser beam 20 emitted from the laser unit 127 of the laser extender 12 directed outwards away from the combination of the laser extender 12 and the beam leveler 10. The laser extender 12 and the beam leveler 10 can be integrated using plug-in, screws, or any similar attachment mechanism that can combine the laser extender 12 and the beam leveler 10 accordingly.

Figure 3:
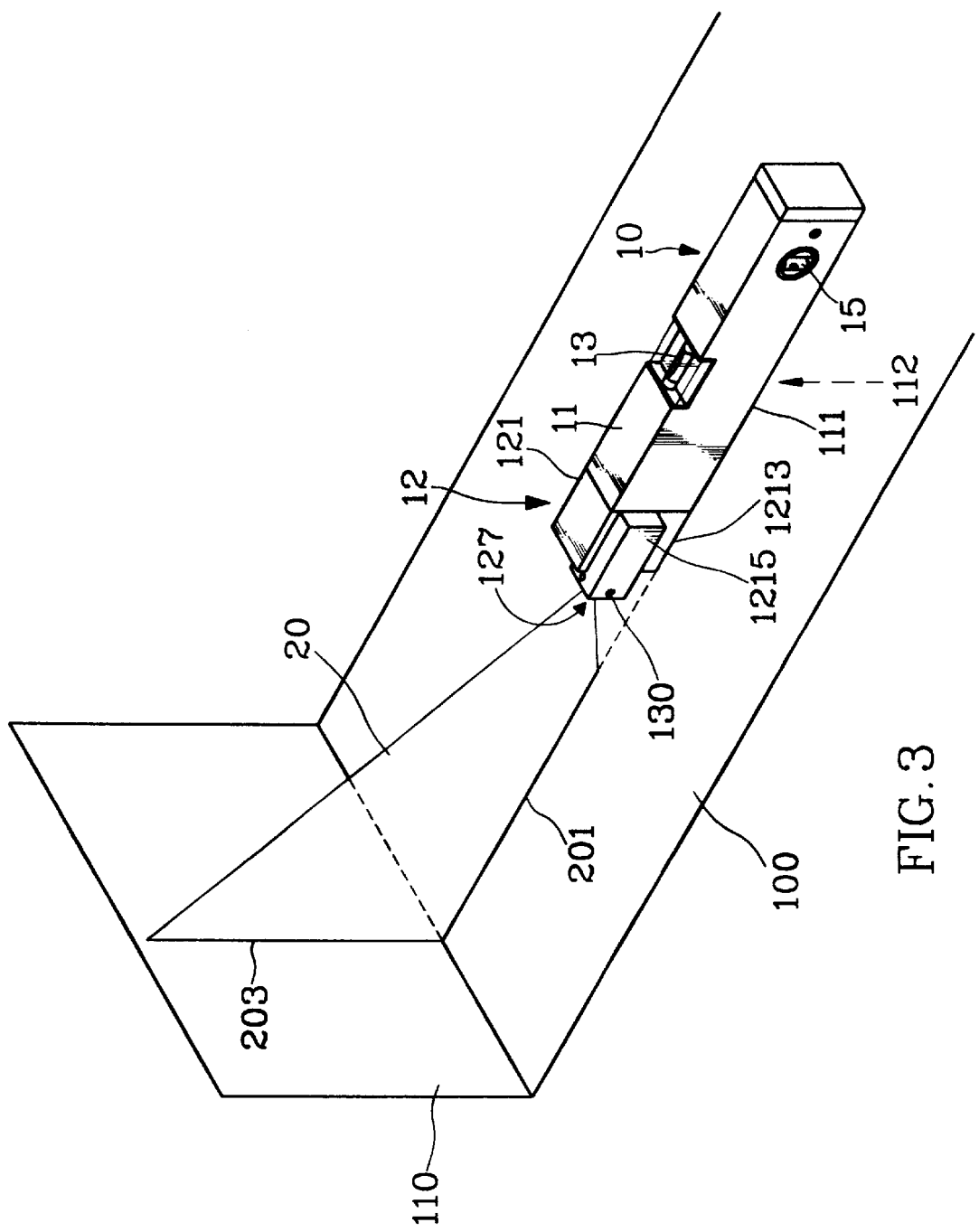
FIG. 3 illustrates an application of the combination of FIG. 2 in defining a horizontal line and a vertical line.

Referring now to FIG.3, when the combination of the laser extender 12 and the beam leveler 10 is used to extend a reference line on a horizontal surface 100, the combination is placed on the horizontal surface 100 by placing the basic flat plane 1212 of the housing 121 as well as the base plane 112 of the beam leveler 10 on the surface 100. The main edge 111 of the beam leveler 10 and/or the straight edge 1213 of the laser extender 12 is then adjusted to be aligned with the desired reference line. After the alignment is done, the spanning plane laser beam 20 is emitted from the laser unit 127 and defines a horizontal extension line 201 of the reference line in such a manner that the spanning plane laser beam 20 touches the horizontal surface 100 and forms a cross line as the horizontal extension line 201. In the case that the spanning plane laser beam 20 projects onto a vertical surface 110, a vertical extension line 203 can also be determined via the cross line of the spanning plane laser beam 20 and the vertical surface 10.

Thus, the laser extender of the present invention provides for the effective and accurate extension of straight lines from a reference line. The use of a laser beam allows the extension to be along any distance, ranging from short to long distances.

While the present invention has been particularly shown and described with reference to preferred embodiments, it will be understood by those skilled in the art that various changes in form and detail may be without departing from the spirit and scope of the present invention.

What is claimed is:

1. A laser extender assembly, comprising:
   (a) a laser extender having:
      a housing having an external basic flat plane thereon for resting upon a flat surface, the basic flat plane having a straight edge defining a reference line, and the housing having an internal accomodating space therein and a plurality of through holes for accessing the internal accomodating space from the exterior of the housing; and
      a laser unit located inside said internal accomodating space, for generating a spanning plane laser beam therefrom that is perpendicular to said basic flat plane and that extends the reference line defined by the straight edge; and
   (b) a beam leveler having a housing that removably couples the housing of the laser extender, a base plane thereon for resting upon a flat surface, and a leveling unit for inspecting leveling status of the base plane, the base plane further including a main edge thereon, such that the base plane is coplanar with the basic flat plane, and the main edge is aligned with the straight edge, when the housing of the beam leveler is coupled with the housing of the laser extender.

2. The assembly according to claim 1, wherein said leveling unit includes a spirit bubble for determining the leveling status of said base plane.

3. The assembly according to claim 1, wherein said leveling unit includes a spirit bubble for determining the perpendicular status of said spanning plane laser beam.

4. The assembly according to claim 1, wherein said housing includes an extension located above said basic flat plane for receiving said laser unit therein, the extension having a hole through which a spanning plane laser beam is emitted.

5. The assembly according to claim 1, wherein said laser unit is adjustable through a plurality of adjustable screws, each screw contacting with the laser unit at one end and accessible at another end from the exterior of said housing.

6. The assembly according to claim 1, wherein said laser unit further includes a switch for controlling ON/OFF of said power and which is accessible from the exterior of said housing through one of said through holes.

7. The assembly according to claim 6, wherein said laser unit further includes a switch cap placed on top of said switch.

8. The assembly of claim 1, wherein the laser extender further includes a battery set provided inside the internal accomodating space for providing power to the laser unit.

* * * * *